US008709295B2

(12) United States Patent
Zelenay et al.

(10) Patent No.: US 8,709,295 B2
(45) Date of Patent: Apr. 29, 2014

(54) NITROGEN-DOPED CARBON-SUPPORTED COBALT-IRON OXYGEN REDUCTION CATALYST

(75) Inventors: Piotr Zelenay, Los Alamos, NM (US); Gang Wu, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 68 days.

(21) Appl. No.: 13/094,594

(22) Filed: Apr. 26, 2011

(65) Prior Publication Data

US 2011/0260119 A1 Oct. 27, 2011

Related U.S. Application Data

(60) Provisional application No. 61/328,067, filed on Apr. 26, 2010.

(51) Int. Cl.
*H01B 1/22* (2006.01)
*B01J 33/00* (2006.01)

(52) U.S. Cl.
USPC ............................................. 252/513; 502/1

(58) Field of Classification Search
USPC ...................... 252/513; 502/1, 101
See application file for complete search history.

(56) References Cited

U.S. PATENT DOCUMENTS

| 7,550,223 B2 | 6/2009 | Zelenay |
| 2008/0113859 A1 | 5/2008 | Popov et al. |

OTHER PUBLICATIONS

Gang Wu et al., Nitrogen-doped magnetic onion-like carbon as support fo Pt particles in a hybrid cathode catalyst for fuel cells, J. Mater. Chem., 2010, 20, 3059-3068.*
Derwent 2009-E71392, Sep. 2008, CN, Liu.*
Lefevre, et al., "Iron-Based Catalysts with Improved Oxygen Reduction Activity in Polymer Electrolyte Fuel Cells," Science, Apr. 3, 2009, vol. 324, pp. 71-74.
Wu, et al., "Pt-free cathode catalysts prepared via multi-step pyrolysis of Fe phthalocyanine and phenolic resin for fuel cells," Chem. Commun., May 27, 2010, vol. 46, pp. 6377-6379.
Wu, et al., "Polyaniline-derived non-Precious Catalyst for the Polymer Electrolyte Fuel Cell Cathode," ECS Transactions, 2008, vol. 2, No. 16, pp. 159-170.
Wu, et al., "Performance Durability of Polyaniline-derived non-Precious Cathode Catalysts," ECS Transactions, 2009, vol. 1, No. 25, pp. 1299-1311.
Yang, et al., "Aligned carbon nanotubes with built-in FeN4 active sites for electrocatalytic reduction of oxygen," Chem. Commun., 2008, pp. 329-331.
Nallathambi, et al., "Development of high performance carbon composite catalyst for oxygen reduction reaction in PEM Proton Exchange Membrane fuel cells," Journal of Power Sources, 2008, vol. 18, pp. 34-42.
Bezerra, et al., "A review of of Fe-N/C and Co-N/C catalysts for the oxygen reduction reaction," Electrochimica Acta, 2008, pp. 4937-4951.
Jaouen, et al., "Cross-Laboratory Experimental Study of the Non-Noble-Metal Electrocatalysts for the Oxygen Reduction Reaction," Applied Materials & Interfaces, 2009, vol. 1, No. 8, pp. 1623-1639.
Koslowski, et al., "Nature of the Catalytic Centers of Porphyrin-Based Electrocatalysts for the ORR: A Correlation of Kinetic Current Density with the Site Density of Fe-N4 Centers," J. Phys. Chem. C, 2008, vol. 112, pp. 15356-15366.
Matter, et al., "The role of nanostructure in nitrogen-containing carbon catalysts for the oxygen reduction reaction," Journal of Catalysis, 2006, vol. 239, pp. 83-96.
Maldonado, et al., "Structure, composition, and chemical reactivity of carbon nanotubes by selective nitrogen doping," Carbon, 2006, vol. 44, pp. 1429-1437.
Subramanian, et al., "Nitrogen-modified carbon-based catalysts for oxygen reduction reaction in polymer electrolyte membrane fuel cells," Journal of Power Sources, 2009, vol. 188, pp. 38-44.
Ikeda, et al., "Carbon Alloy Catalysts: Active Sites for Oxygen Reduction Reaction," The Journal of Physical Chemistry C, 2008, vol. 112, pp. 14706-14709.
Wakabayashi, et al., "Temperature-dependence of oxygen reduction activity at a platinum electrode in an acidic electrolyte solution investigated with a channel flow double electrode," Journal of Electroanalytical Chemistry, 2005, vol. 574, pp. 339-346.
Coutanceau, et al., "Electrocatalytic reduction of dioxygen at platinum particles dispersed in polyaniline film," Electrochimica Acta, Apr. 19, 2000, vol. 46, pp. 579-588.
Wu, et al., "Carbon-supported Co1.67Te2 nanoparticles as elctrocatalysts for oxygen reduction reaction in alkaline electrolyte," Journal of Materials Chemistry, Feb. 23, 2009, vol. 19, pp. 6581-6589.
Wu, et al., "Anodically electrodeposited Co + Ni mixed oxide electrode: preparation and electrocatalytic activity for oxygen evolution in alkaline media," Journal of Solid State Chem., Mar. 5, 2004, vol. 177, pp. 3682-3692.
Wu, et al., "Nitrogen-doped magnetic onion-like carbon as support for Pt particles in a hybrid cathode catalyst for fuel cells," Journal of Materials Chem., 2010, vol. 20, pp. 3059-3068.
Wu, et al., "Enhanced methanol electro-oxidation activity of PtRu catalysts supported on heteroatom-doped carbon," Electrochimica Acta, 2008, vol. 53, pp. 7622-7629.
Wu, et al., "Well-Dispersed High-Loading Pt Nanoparticles Supported by Shell-Core Nanostructured Carbon for Methanol Electrooxidation," Langmuir, 2008, vol. 24, pp. 3566-3575.
Qu, et al., "Nitrogen-Doped Graphene as Efficient Metal-Free Electrocatalyst for Oxygen Reduction in Fuel Cells," www.acsnano.org, 2010, vol. 4, No. 3, pp. 1321-1326.
Wu, et al., "High-Performance Electrocatalysts for Oxygen Reduction Derived from Polyaniline, Iron, and Cobalt," Science, Apr. 22, 2011, vol. 332, pp. 443-447.

* cited by examiner

*Primary Examiner* — Monique Peets
(74) *Attorney, Agent, or Firm* — Samuel L. Borkowsky; Los Alamos National Security, LLC

(57) ABSTRACT

A Fe—Co hybrid catalyst for oxygen reaction reduction was prepared by a two part process. The first part involves reacting an ethyleneamine with a cobalt-containing precursor to form a cobalt-containing complex, combining the cobalt-containing complex with an electroconductive carbon supporting material, heating the cobalt-containing complex and carbon supporting material under conditions suitable to convert the cobalt-containing complex and carbon supporting material into a cobalt-containing catalyst support. The second part of the process involves polymerizing an aniline in the presence of said cobalt-containing catalyst support and an iron-containing compound under conditions suitable to form a supported, cobalt-containing, iron-bound polyaniline species, and subjecting said supported, cobalt-containing, iron bound polyaniline species to conditions suitable for producing a Fe—Co hybrid catalyst.

11 Claims, 15 Drawing Sheets

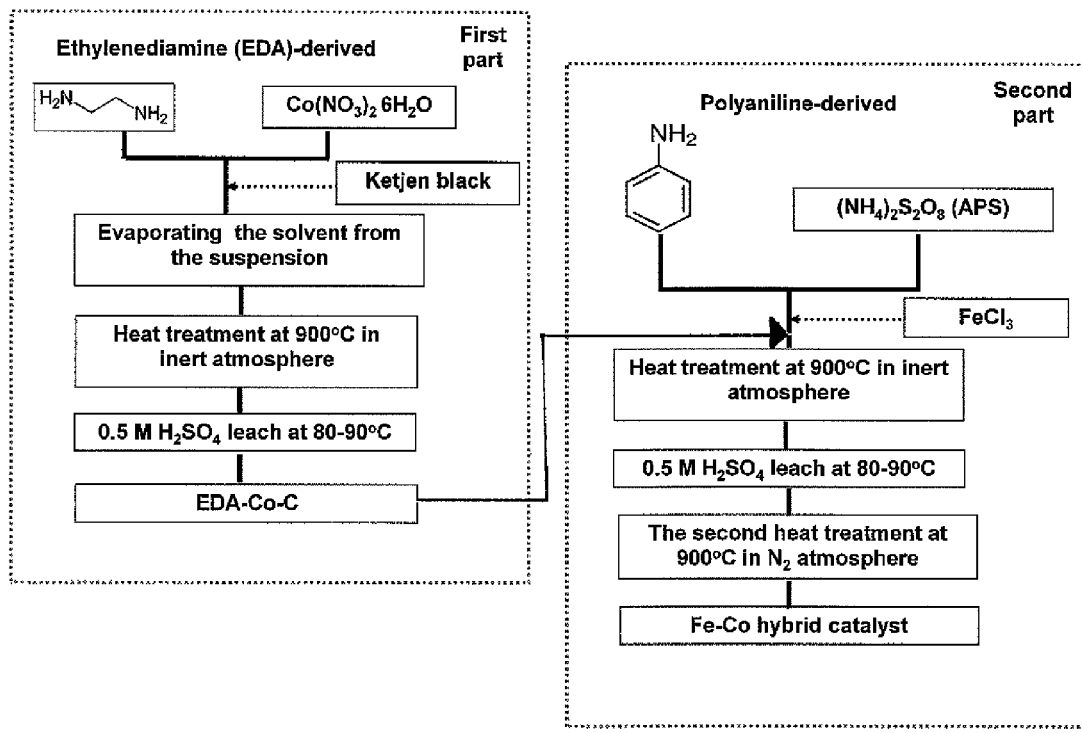
*Fig. 1a*  *Fig. 1b*

NITROGEN-DOPED CARBON-SUPPORTED COBALT-IRON OXYGEN REDUCTION CATALYST

RELATED APPLICATIONS

This application claims the benefit of U.S. Provisional Patent Application Ser. No. 61/328,067 entitled "Non-Precious Metal Fuel Cell Catalysts," filed Apr. 26, 2010, incorporated by reference herein.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to catalysts for polymer electrolyte fuel cells, to a method for making the catalysts, and to electrochemical cells that include the catalysts.

BACKGROUND OF THE INVENTION

Electrochemical fuel cells convert fuel such as $H_2$ or methanol, and oxidant such as air or $O_2$, to electricity and reaction product. Solid polymer electrochemical fuel cells generally employ a membrane electrode assembly ("MEA") in which an electrolyte in the form of an ion-exchange membrane is disposed between an anode layer and a cathode layer. These electrode layers are made from porous, electrically conductive sheet material, such as carbon fiber paper or carbon cloth. In a typical MEA, the electrode layers provide structural support to the membrane which typically thin and flexible.

The MEA contains a catalyst, typically comprising finely comminuted platinum particles disposed in a layer at each membrane/electrode layer interface, to catalyze the desired electrochemical reaction. The electrodes are electrically coupled to provide a path for conducting electrons between the electrodes through an external load.

It is generally believed that the large-scale practical application of fuel cells will be difficult to achieve if the expensive platinum-based cathode catalyst, which carries out the oxygen reduction reaction (ORR), cannot be realized either with significantly reduced catalyst loading or with another efficient, low-cost, and durable catalyst. As a result, the development of non-precious metal catalysts (NPMCs) with high oxygen reduction reaction activity and improved durability has become a major focus area of polymer electrolyte fuel cell (PEFC) research as a way of reducing the PEFC cost.

NPMCs have been developed over the years. The synthesis typically includes a heat-treatment step wherein precursors of nitrogen, carbon, and transition-metals are combined at an elevated temperature to produce active sites for oxygen reduction [1, 2].

Factors affecting catalyst performance are believed to include the types of nitrogen precursors and the transition metal(s) used. Some NPMCs for oxygen reduction were derived from heteroatomic polymers such as polyaniline (PANI) and polypyrrole (PPy) [3,4], and were synthesized by heat-treating a hybrid precursor material containing PANI or PPy, polymerized in situ onto conventional carbon black and nanotubes in the presence of iron and cobalt species. The Fe and Co species of these catalysts are believed to contribute differently to the active sites for oxygen reduction. The Co species appear to promote nitrogen doping into graphitized carbon by forming abundant pyridinic structures, which are presumed active ORR sites. With an onset oxygen reduction potential of approximately 0.8 V, this species has electrochemical properties similar to that exhibited by metal-free N—C catalysts. By contrast, Fe species are presumed to participate at an active site by coordinating the pyridinic and pyrrolic nitrogen atoms, similar to Fe—$N_4$[5]. The latter site is more active and gives rise to an onset potential higher than 0.9 V that is less overpotential for ORR [3]. The Fe—Co hybrid catalyst exhibits oxygen reduction reaction activity, and also long-term performance durability that is believed to be due to a stabilizing role of Co.

A need remains for better non-precious metal catalysts that approach, meet, or exceed the performance and durability precious metal catalysts such as platinum.

An object of this invention is an active and durable oxygen reduction reaction catalyst.

Another object of this invention is a method for preparing an active and durable oxygen reduction reaction catalyst.

SUMMARY OF THE INVENTION

The present invention meets the aforementioned need by providing non-precious metal catalysts, supports, and a method of making the catalysts. An aspect of this invention relates to non-precious metal oxygen reduction reaction catalysts for cathodes of polymer electrolyte fuel cells. This aspect has produced a polyaniline-derived non-precious metal catalyst that has narrowed the performance gap with platinum (Pt) with a typical catalyst loading (0.06 mg/cm$^2$) compared to a total loading of 0.60 mg/cm$^2$ for the PANI-derived non-precious metal catalyst. The gap has been reduced to less than 35 mV at the rotating disk electrode (RDE) half-wave potential.

Embodiment catalysts of this invention include Fe species and Co species. While not wishing to be bound by the present explanation, it is believed that the roles of the Fe species and Co species are different in these non-precious metal catalysts. The Co species appear to promote nitrogen doping into graphene sheets by forming abundant pyridinic structures, which constitute one of the presumed active oxygen reduction reaction sites, with an onset reduction potential of about 0.8 V, similar to that exhibited by N—C catalysts synthesized without any metal present. In turn, the Fe species appear to directly participate in an active site of a different type. That site may involve Fe stabilized by coordinated pyridinic and pyrrolic nitrogen, somewhat different than the Fe—$N_4$ species proposed earlier (see, e.g., Popov et al., US Published Patent Application 2008/0113859, or Lefevre et al., Science, 324, 71, 2009). The latter site gives rise to the onset potential that is often higher than 0.9 V.

An aspect of the invention relates to a hybrid Fe—Co hybrid catalyst for oxygen reaction reduction. An embodiment was prepared by a two part process. The first part involves reacting an ethyleneamine with a cobalt-containing precursor to form a cobalt-containing complex, combining the cobalt-containing complex with an electroconductive carbon supporting material, heating the cobalt-containing complex and carbon supporting material under conditions suitable to convert the cobalt-containing complex and carbon supporting material into a cobalt-containing catalyst support. The second part of the process involves polymerizing an aniline in the presence of said cobalt-containing catalyst support and an iron-containing compound under conditions suitable to form a supported, cobalt-containing, iron-bound polyaniline species, and subjecting said supported, cobalt-containing, iron bound polyaniline species to conditions suitable for producing a Fe—Co hybrid catalyst.

The invention also includes an electrode that comprises a Fe—Co hybrid catalyst prepared by a two part process. The first part involves reacting an ethyleneamine with a cobalt-containing precursor to form a cobalt-containing complex, combining the cobalt-containing complex with an electroconductive carbon supporting material, heating the cobalt-containing complex and carbon supporting material under conditions suitable to convert the cobalt-containing complex and carbon supporting material into a cobalt-containing catalyst support. The second part of the process involves polymerizing an aniline in the presence of said cobalt-containing catalyst support and an iron-containing compound under conditions suitable to form a supported, cobalt-containing, iron-bound polyaniline species, and subjecting said supported, cobalt-containing, iron bound polyaniline species to conditions suitable for producing a Fe—Co hybrid catalyst.

The invention also includes an electrochemical cell that comprises a Fe—Co hybrid catalyst prepared by a two part process. The first part involves reacting an ethyleneamine with a cobalt-containing precursor to form a cobalt-containing complex, combining the cobalt-containing complex with an electroconductive carbon supporting material, heating the cobalt-containing complex and carbon supporting material under conditions suitable to convert the cobalt-containing complex and carbon supporting material into a cobalt-containing catalyst support. The second part of the process involves polymerizing an aniline in the presence of said cobalt-containing catalyst support and an iron-containing compound under conditions suitable to form a supported, cobalt-containing, iron-bound polyaniline species, and subjecting said supported, cobalt-containing, iron bound polyaniline species to conditions suitable for producing a Fe—Co hybrid catalyst.

The invention also includes a method for preparing a Fe—Co hybrid catalyst. The method comprises a two part method. The first part involves reacting an ethyleneamine with a cobalt-containing precursor to form a cobalt-containing complex, combining the cobalt-containing complex with an electroconductive carbon supporting material, heating the cobalt-containing complex and carbon supporting material under conditions suitable to convert the cobalt-containing complex and carbon supporting material into a cobalt-containing catalyst support. The second part of the process involves polymerizing an aniline in the presence of said cobalt-containing catalyst support and an iron-containing compound under conditions suitable to form a supported, cobalt-containing, iron-bound polyaniline species, and subjecting said supported, cobalt-containing, iron bound polyaniline species to conditions suitable for producing a Fe—Co hybrid catalyst.

The present invention also involves a method for preparing the hybrid catalyst. The method comes in two parts. The first part involves synthesis of a catalyst support, and it involves i) combining a cobalt-containing precursor, an ethyleneamine, and carbon black and a first suitable solvent to produce a suspension;

ii) evaporating the solvent from the suspension to form an intermediate mixture; followed by iii) heating the intermediate mixture in an inert atmosphere; and iv) acidifying to form a first mixture.

Next, a polyaniline-iron complex is prepared by combining an iron-containing precursor with a polyaniline compound in a second suitable solvent to produce a second mixture. The first mixture is combined with the second mixture to produce a third mixture, which is heated in an inert atmosphere to a first temperature. Subsequently, the third mixture is acidified and reheated to a second temperature to anchor the polyaniline-iron complex to the catalyst support.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 1a-b shows a flow diagram of the preparation of an embodiment Co—Fe hybrid catalyst. FIG. 1a shows the first part for preparing a cobalt-containing catalyst support and FIG. 1b shows the second part that uses the catalyst support to make the hybrid catalyst.

FIG. 2 (a) plots current density versus voltage. FIG. 2 (b) shows results of a RDE durability test by cycling in $N_2$-saturated 0.5 M $H_2SO_4$. FIG. 2 (c) shows Tafel plots. FIG. 2 (d) shows Arrhenius plots.

The plot of current density versus potential illustrates the combination of EDA-Co—C with a PANI-derived catalyst led to a positive shift of about 20 mV in half-wave potential during a rotating disk electrode (RDE) test and rotating ring disk electrode (RRDE) test.

Figure 3A:
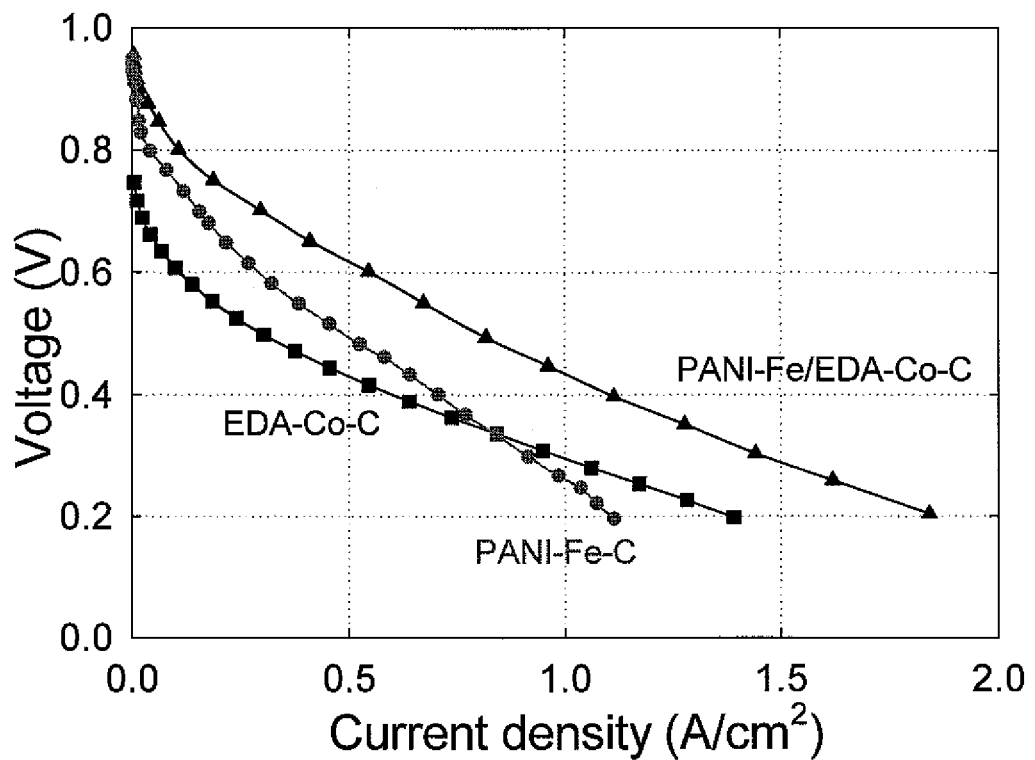
Figure 3B:
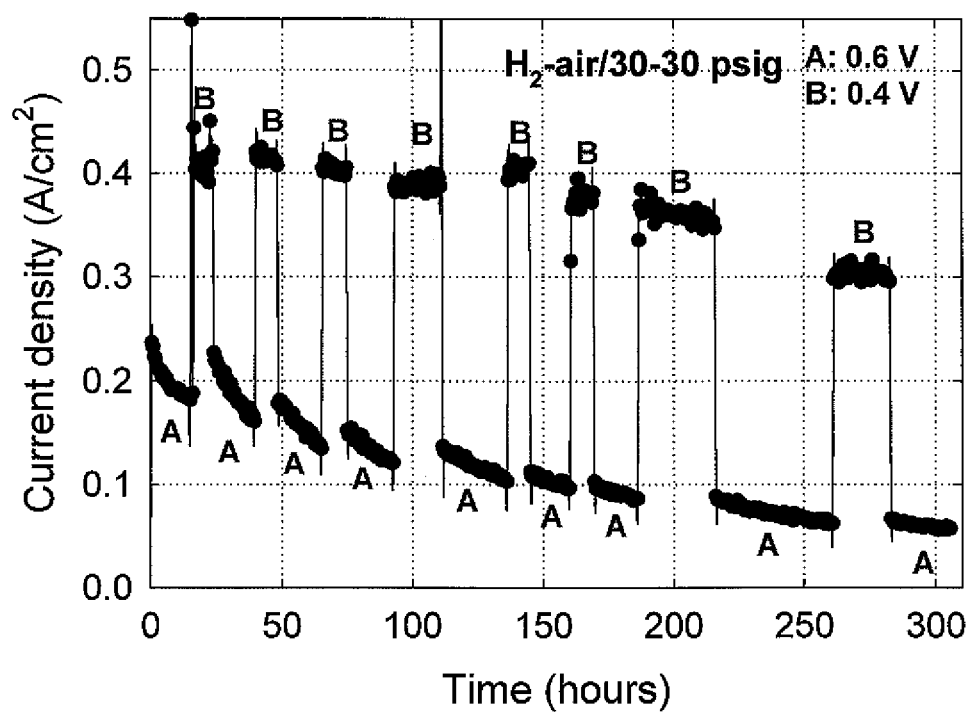
Figure 3C:
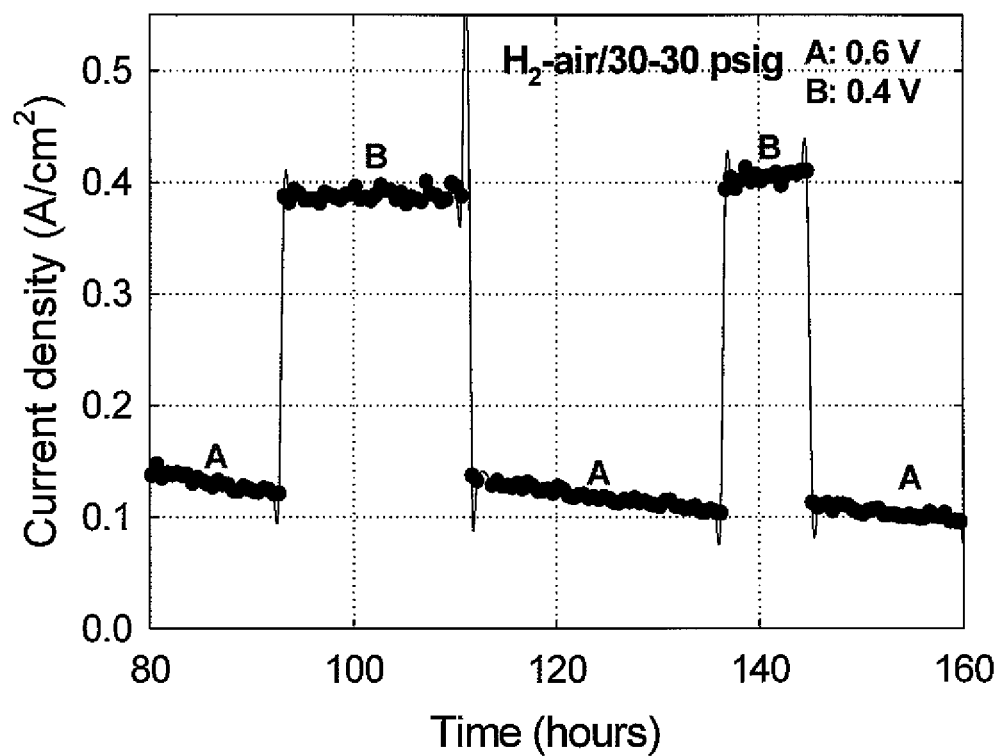

FIG. 3a shows test fuel cell performance using an embodiment hybrid Fe—Co catalyst of the present invention, and FIG. 3b and FIG. 3c shows a plot of current density versus time in hours for the hybrid catalyst, illustrating the effect of voltage on durability of the hybrid catalyst.

Figure 4:
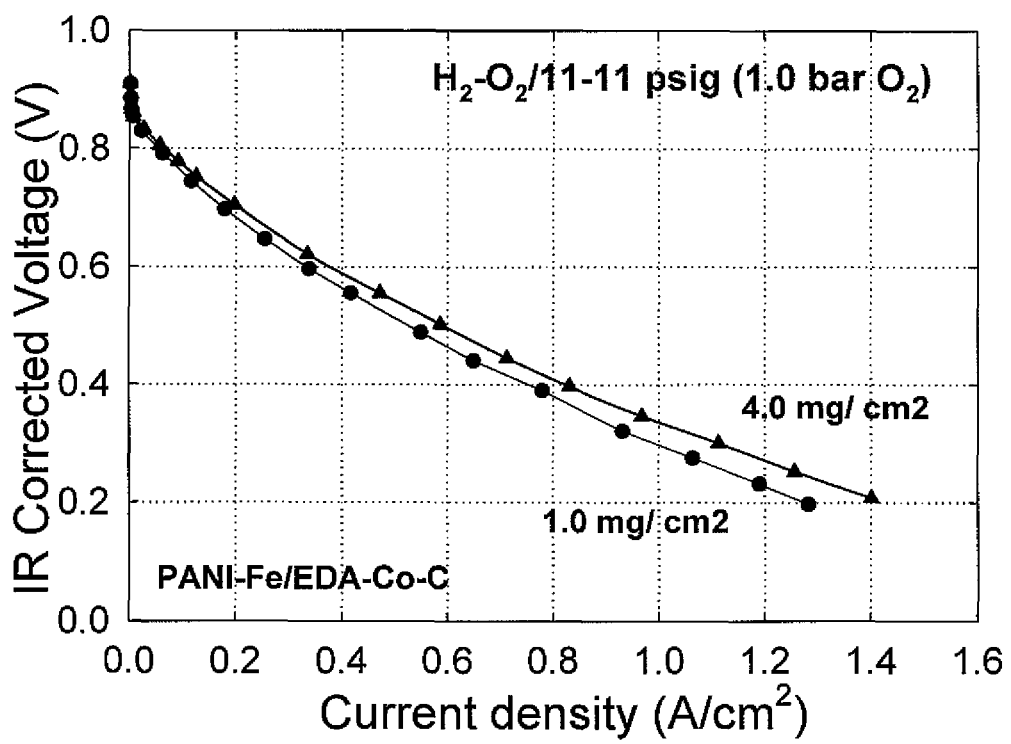

FIG. 4 shows additional test fuel cell performance including measurement of volumetric activity using low catalyst loading in a membrane electrode assembly (MEA). Fuel cell polarization plots were recorded with PANI-Fe/EDA-Co—C cathode catalysts at different catalyst loading using U.S. DOE testing protocol: $H_2$—$O_2$/1.0-1.0 bar; anode: 0.25 milligrams Pt per square centimeter, membrane: Nafion® 212; cell temperature: 80° C.

Figure 5A:
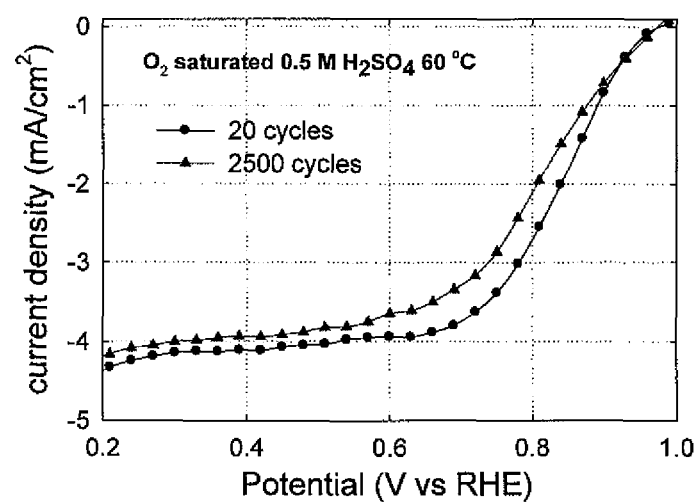
Figure 5B:
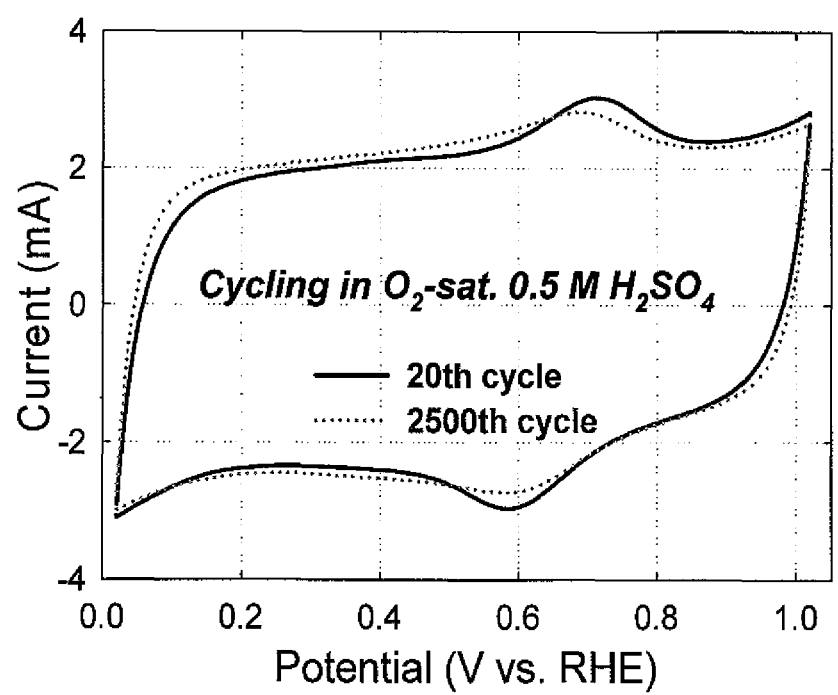

FIGS. 5a and 5b show plots illustrating cycled systems during RDE testing.

Figure 6A:
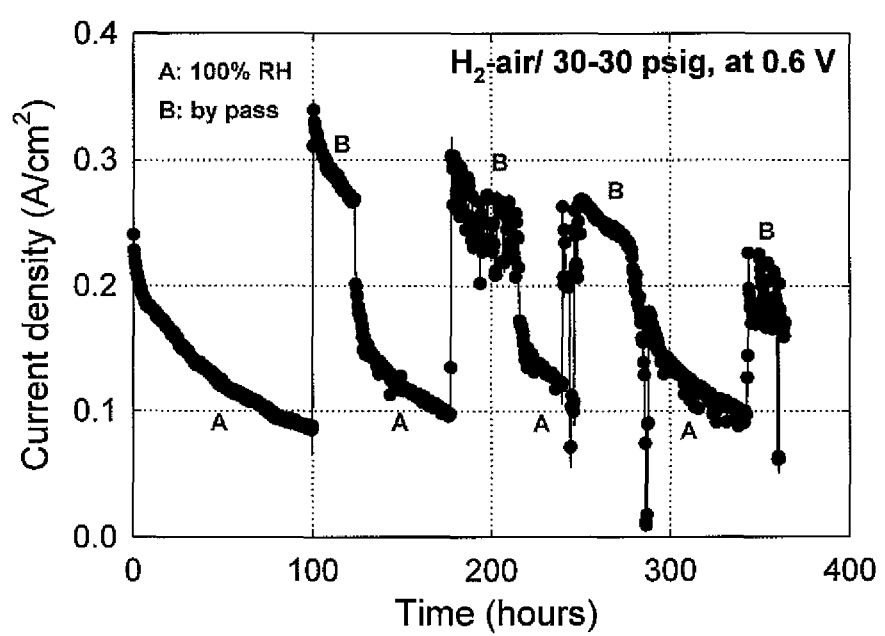
Figure 6B:
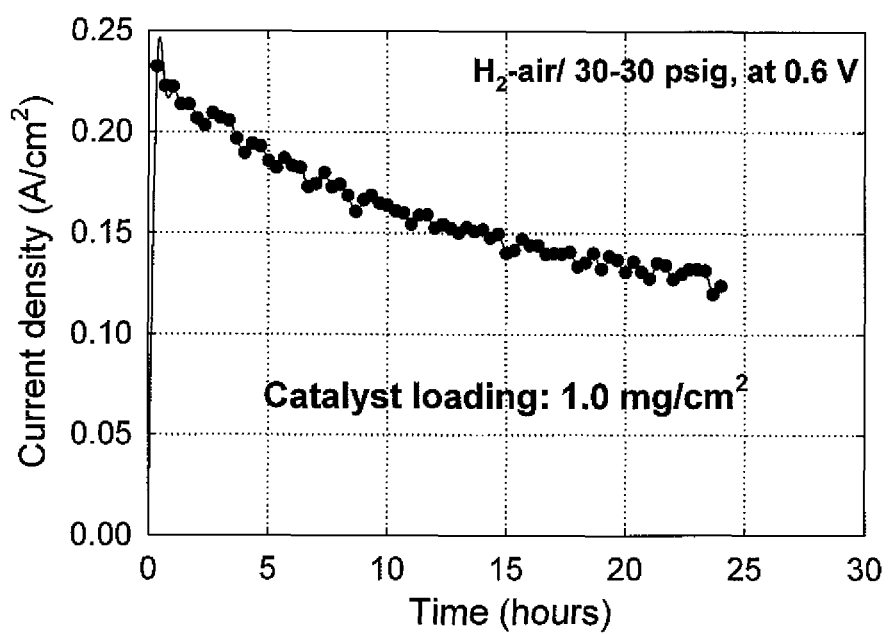

FIGS. 6a and 6b show results plotted for the effect of humidity on durability.

Figure 7:
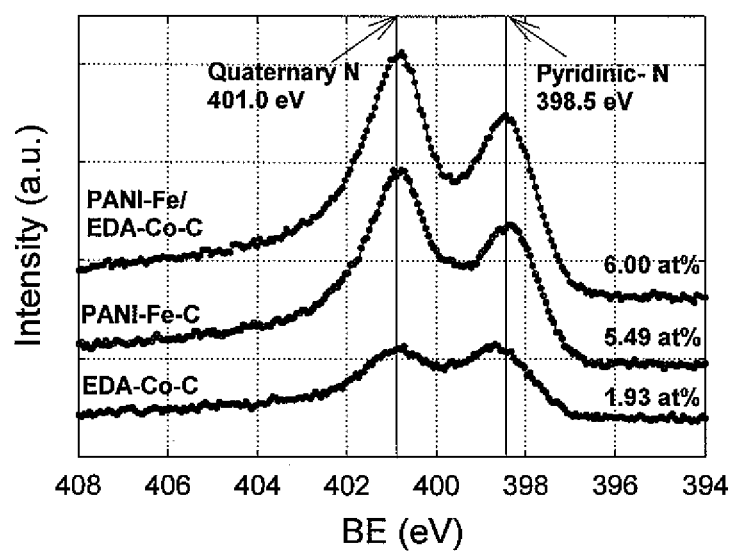

FIG. 7 compares the N 1s XPS spectra for the catalyst support, the PANI-Fe, and the embodiment hybrid Fe—Co catalyst.

Figure 8:
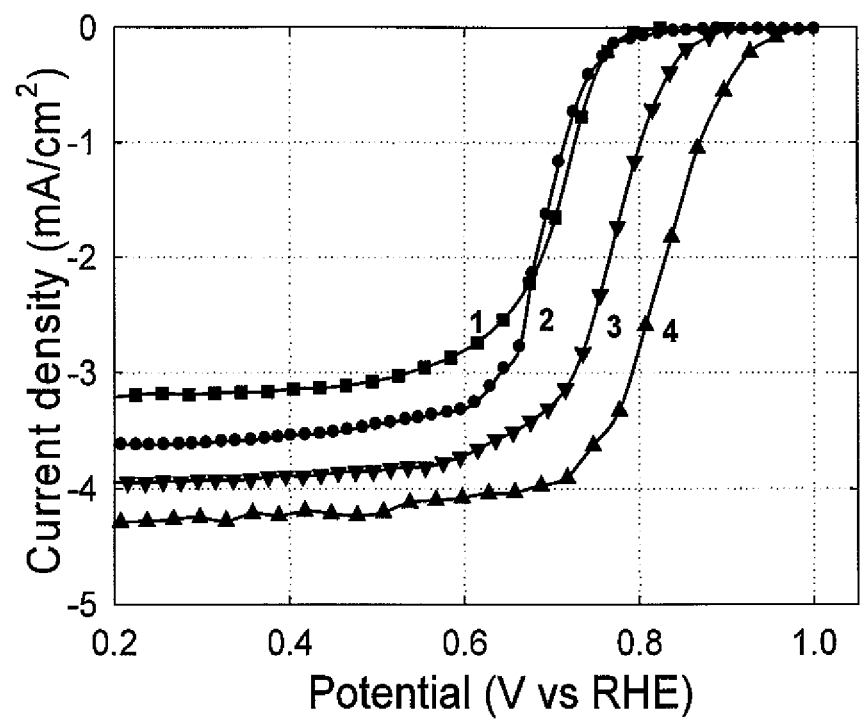

FIG. 8 shows a plot comparing the performance of the embodiment Fe—Co hybrid catalyst of this invention with two other Fe—Co hybrid catalysts. The embodiment Fe—Co hybrid catalyst of this invention has the best performance of the three.

DETAILED DESCRIPTION OF THE INVENTION

The present invention relates to catalysts useful in polymer electrolyte fuel cells. The invention also relates to polymer electrolyte fuel cells containing the catalysts and catalyst supports. The present invention further relates to methods of making the catalysts and catalyst supports.

In all embodiments of the present invention, all percentages are by weight of the total composition, unless specifically stated otherwise. All ranges are inclusive and combinable. All numerical amounts are understood to be modified by the word "about" unless otherwise specifically indicated.

All documents cited in the Detailed Description of the Invention are, in relevant part, incorporated herein by reference; the citation of any document is not to be construed as an admission that it is prior art with respect to the present invention.

To the extent that any meaning or definition of a term in this document conflicts with any meaning or definition of the same term in a document incorporated by reference, the meaning or definition assigned to that term in this document shall govern.

Briefly, a hybrid Fe—Co catalyst was prepared in a two part process. The hybrid Fe—Co catalyst may be used in an electrode for the oxygen reduction reaction taking place in an electrochemical cell such as a polymer electrolyte fuel cell (PEFC). The details of the synthesis are provided (vide infra).

The performance of the hybrid Fe—Co catalyst was determined using a set-up including a rotating disk electrode (RDE). A CHI Electrochemical Station (Model 750b) was used with the RDE in a conventional three-electrode cell at a rotating disk speed of 900 rpm at room temperature. Unless otherwise noted, the catalyst loading on the RDE was held at 0.6 mg/cm$^{-2}$. Graphite-rod and Ag/AgCl (3 M NaCl, 0.235 V vs. RHE, RHE is reversible hydrogen electrode) were used as the counter and reference electrodes, respectively. ORR steady-state polarization curves were measured in oxygen-saturated 0.5 M $H_2SO_4$ electrolyte with a potential step of 0.03 V and a period time of 30 s.

PANI-derived non-precious metal catalysts, such as the Fe—Co hybrid catalyst, were tested at the fuel cell cathode to evaluate their activities and durabilities under PEFC operating conditions. Catalyst inks were prepared by ultrasonically mixing catalyst powders with Nafion® solution for four hours. The inks were then applied to the gas diffusion layer (GDL, ELAT LT 1400W, E-TEK) by successive brush-painting in layers until the cathode catalyst loading reached 4 mg cm$^{-2}$. The Nafion® content in the dry catalyst was controlled around 35 wt %. A commercially-available Pt-catalyzed cloth GDL (E-TEK, 0.25 milligrams of platinum per square centimeter ($mg_{Pt}$ cm$^{-2}$) was used as the anode. The cathode and anode were hot-pressed onto the opposite sides of a Nafion® 212 membrane. The geometric area of the MEA was 5.0 cm$^2$. Fuel cell testing was carried out in a single cell with serpentine anode/cathode flow channels. Pure hydrogen and oxygen humidified at 85° C. were supplied to the anode and cathode at a flow rate of 200 and 400 mL min$^{-1}$, respectively. Both electrodes were maintained at the same backpressure of 2.8 bar (about 40 psi absolute pressure at the Los Alamos altitude). Fuel cell polarization plots were recorded using fuel cell test stations (Fuel Cell Technologies, Inc.). The reference polarization fuel cell plot with a Pt/C catalyst at the cathode was recorded at a cell temperature of 80° C. and backpressures of 2.8 ($H_2$)-2.8 bar (air).

Elemental quantification and species analysis using X-ray photoelectron spectroscopy (XPS) were performed using an ESCA 210 and MICROLAB 310D spectrometer. Mid-infrared spectra were recorded with a Nicolet 670 FTIR spectrometer on potassium bromide (KBr) pellets. The sample morphology was characterized by scanning electron microscopy (SEM) on an FEI Quanta 400 ESEM instrument. High-resolution transmission electron microscopy (HR-TEM) images were taken on a JEOL 3000F microscope operating at 300 kV.

The crystallinity of various samples was determined by X-ray diffraction (XRD) using a BRUKER AXS D8 Advance diffractometer with Cu Kα radiation.

To take advantage of both Co and Fe catalyst properties with the aim of achieving active and durable non-precious metal catalysts, the present invention provides a non-precious metal oxygen reduction reaction catalyst and method for preparing the catalyst.

Figure 2A:
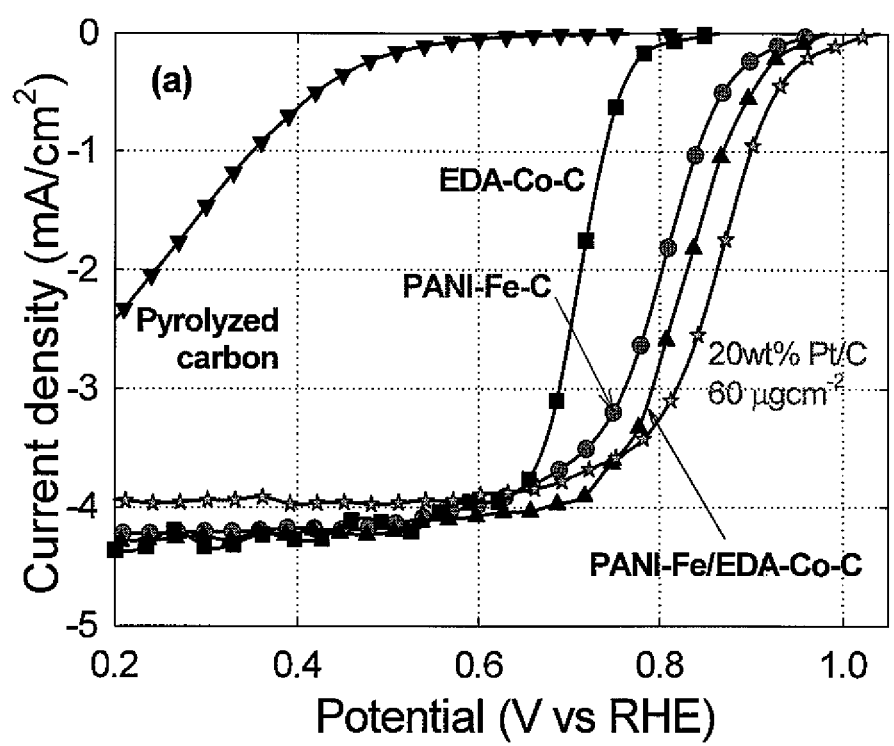
FIGS. 2a-d show steady-state rotating disk electrode (RDE) polarization plots of oxygen reduction reaction (ORR) for pyrolyzed carbon, a precious metal catalyst, and two non-precious metal catalysts at 25° C., a rotation rate of 900 rpm. The non-precious metal catalysts were in an electrolyte of 0.5 M $H_2SO_4$ while the precious metal catalyst was in an electrolyte of 0.1M $HClO_4$ (Pt/C catalyst). Loading of non-precious metal catalysts was 0.6 mg $cm^{-2}$.

The synthesis of this hybrid catalyst is a two part synthesis. The first part involves preparing a cobalt-containing catalyst support. This support has catalytic properties by itself, but is still referred to as a catalyst support because of its support function in the final Co—Fe hybrid catalyst. As FIG. 2a shows, in the first part of the synthesis, the catalyst support is synthesized by heat-treating a Co species chelated with an ethylamine called ethylenediamine. The catalyst support is referred to in FIG. 2a as EDA-Co—C. Although EDA is part of the name shown in FIG. 2a, it should be understood that the catalyst support likely contains no EDA. The EDA is meant to convey that EDA was used. This catalyst support is believed to aid catalyzing the oxygen reduction of the Co—Fe hybrid catalyst to more positive potentials than traditional carbon supporting materials [6].

In an embodiment of the first part, ethylenediamine (EDA) was combined with cobalt nitrate hexahydrate (Co(NO$_3$)$_2$.6H$_2$O) to form an EDA-Co chelate complex in ethanol solution. This chelate complex was thoroughly impregnated into HCl-treated carbon black (Ketjenblack EC-300J, Lion Akzo Co. Ltd). Suitable examples of carbon black are available commercially under the trade names Vulcan™ XC-72 (available from Cabot Corp., Alpharetta, Ga.), Ketjen Black™ EC 300 J (available from Lion Akzo Co., Ltd.), and Black Pearl™ 2000 (available from Cabot Corp., Alpharetta, Ga.). After vacuum-drying using a rotary evaporator and subsequent high-temperature heating (900° C. in $N_2$ atmosphere for one hour) and acid leaching treatments (0.5 M $H_2SO_4$ at 80° C. for eight hours), the final EDA-Co—C catalyst support was obtained. The name EDA-Co—C does not imply that this catalyst support, after heating at 900° C. has any ethylenediamine left in the support, but that the support was derived from EDA. This final catalyst support was used in the second part, shown in FIG. 1b.

Figure 2B:
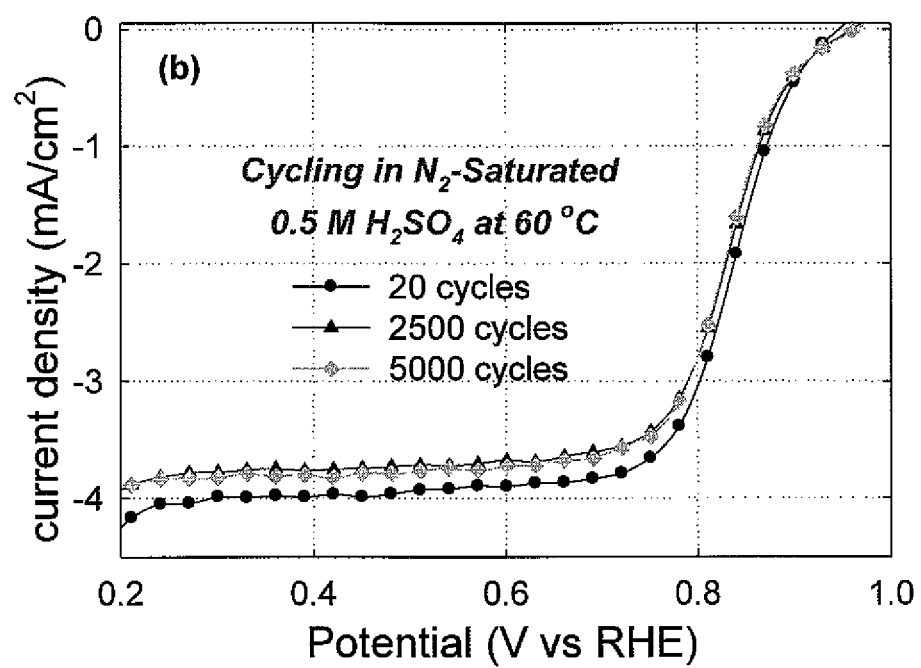

In an embodiment of the second part, shown in FIG. 2b, a PANI-Fe complex is anchored to the catalyst support and heated treated to produce a Co—Fe containing hybrid catalyst. As FIG. 2b shows, polyaniline (PANI) was polymerized in-situ onto the catalyst support in the presence of iron (III) chloride (FeCl$_3$) and ammonium persulfate ((NH$_4$)$_2$S$_2$O$_8$). Ammonium persulfate is an oxidizing agent. The resulting suspension was treated by heating at 900° C. in $N_2$ gas for one hour. The result of this heating was carbonization of the PANI. In an embodiment, also shown in FIG. 2b, subsequent chemical leaching was accomplished using sulfuric acid (0.5 M $H_2SO_4$ at 80° C. for eight hours) followed by a second heat treatment (900° C. in $N_2$ gas for three hour). This subsequent treatment further enhances the ORR activity by exposing more active sites and adjusting the surface hydrophilicity of the catalyst.

In an embodiment of the two part synthesis for preparing a Fe—Co hybrid catalyst of this invention, Ketjenblack EC 300J (AkzoNobel) with BET surface area of about 950 m$^2$ g$^{-1}$ and good corrosion resistance was treated in HCl solution for 24 hours to remove metal impurities. 2.0 ml EDA was reacted with 0.50 g Co(NO$_3$)$_2$.6H$_2$O in 500 ml ethanol solution. The resulting chelate complex was thoroughly impregnated into 0.40 g of the HCl-treated carbon black. After vacuum-drying using a rotary evaporator and subsequent high-temperature heating (900° C. in $N_2$ atmosphere for one hour) and acid leaching treatments (0.5 M $H_2SO_4$ at 80° C. for eight hours), the final EDA-Co—C catalyst support was ready for next part, which began by dispersing 0.4 grams of the catalyst support with an amount of about 2-3 milliliters polyaniline in 500 ml 0.5 M HCL solution. The resulting suspension was kept below 10° C. while 5.0 g of the oxidant ammonium peroxydisulfate (APS) and 3.0 g $FeCl_3$ were added. After constant mixing for 24 hours to allow the polymerized PANI to uniformly mix and cover the carbon black particles, the suspension was vacuum-dried using a rotary evaporator. The subsequent heat-treatment was performed at 900° C. in an inert atmosphere of a nitrogen gas for 1 hour. The heat-treated sample was then pre-leached in 0.5 M $H_2SO_4$ at 80° C. for 8 hours to remove unstable and inactive species from the catalyst, and thoroughly washed in de-ionized water. Finally, the catalyst was heat-treated again in nitrogen-gas atmosphere for 3 hours. The product prepared according to the two part synthesis described above will be referred to hereafter as the Fe—Co hybrid catalyst or the embodiment Fe—Co hybrid catalyst.

The oxygen reduction reaction (ORR) catalytic activity for the Fe—Co hybrid catalyst was measured, as were the activities for EDA-Co—C alone (i.e. the catalyst support), PANI-Fe—C alone, and a reference material, which was E-TEK 20 wt % Pt/C catalyst. The activities were measured with a rotating disk electrode (RDE). FIG. 2a shows graphs that compare the activities. As FIG. 2a shows, relative to the heat-treated carbon (E-TEK), a significant improvement in activity is observed with the EDA-Co—C sample as the onset ORR potential was positively shifted from 0.4 to 0.80 V. In contrast, the PANI-Fe catalyst, which uses a different nitrogen precursor and transition metal, exhibits much higher ORR activity, which is seen as even further positive shifts in onset and half-wave potentials ($E_{1/2}$) to 0.91 and 0.81V, respectively. In the case of the hybrid catalyst, the utilization of EDA-Co—C as a support leads to a 20 mV positive shift in half-wave potential in RDE tests as compared to the isolated PANI-Fe—C catalyst.

A vigorous debate has ensued regarding whether metal atoms in these types of catalysts participate directly in the active sites [1, 2, 7, 8, 9] or merely catalyze the formation of active sites from carbon, nitrogen, and perhaps oxygen atoms [10, 11, 12, 13]. It is believed that the nature of the active sites for the oxygen reduction reaction is different for Co-based catalysts and Fe-based catalysts.

Without wishing to be bound by any particular theory or explanation, it is believed that the Co species of Fe—Co hybrid catalysts facilitates the creation of favorable C—$N_x$ morphologies, which contributes to the observed improvement in ORR activity. It is also believed that Fe species loaded onto the catalyst support contributes to the production of highly active, complexed Fe species at these C—N morphologies. Loading differences notwithstanding, the performance gap, expressed in terms of $E_{1/2}$, as measured in RDE experiments, between the embodiment Fe—Co hybrid catalyst (600 micrograms of catalyst per square centimeter) and Pt/C (60 micrograms of platinum per square centimeter) has been reduced to approximately 35 mV.

In accordance with the accelerated stress testing (AST) protocols proposed by the United States Department of Energy for fuel cell cathode catalysts, the durability of the embodiment hybrid Fe—Co catalyst was tested under voltammetric cycling conditions in the potential range from 0.6 to 1.0 V in $N_2$-saturated 0.5 M $H_2SO_4$. As FIG. 2b shows, only a 10 mV loss in half-wave potential was observed after 5,000 cycles.

Figure 2C:
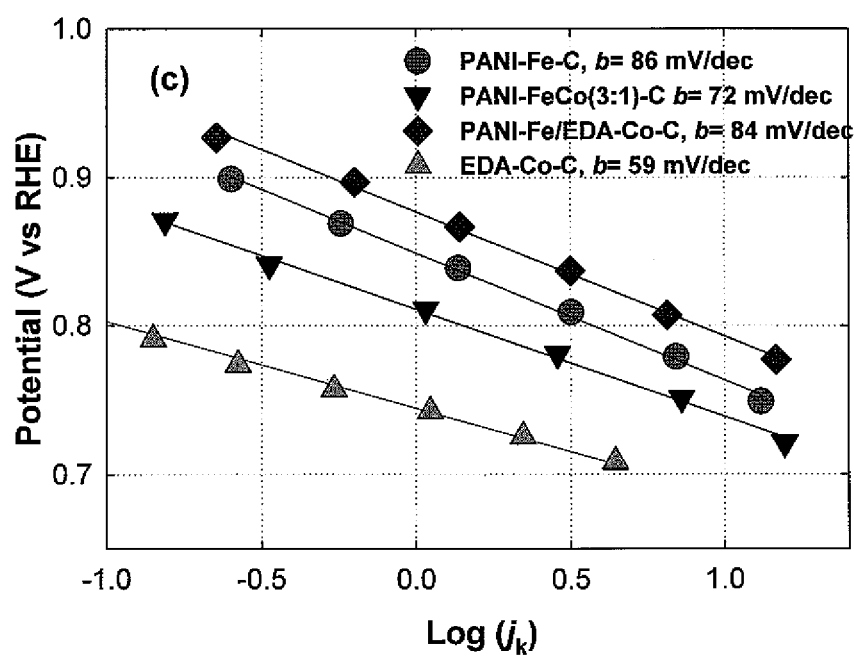

A kinetic parameter known as the Tafel slope was determined to further evaluate the ORR kinetic character for these materials. Kinetic current densities, extracted from the steady-state polarization plot, were used to plot the Tafel curves shown in FIG. 2c. These curves were plotted according to the Koutecky-Levich equation. Using a linear fitting, the values of the Tafel slopes are found to be approximately 59 and 84 mV $dec^{-1}$ for the EDA-Co—C catalyst support and PANI-Fe—C catalysts, respectively. The EDA-Co—C catalyst support has a lower Tafel slope, similar to that of PANI-Co—C (67 mV $dec^{-1}$), but is significantly less ORR active. The PANI-Fe—C catalyst is more active and exhibits a more than 100 mV positive shift in oxygen-reduction onset potential when compared to EDA-Co catalyst. This significant difference in the Tafel slopes suggests different active sites and different mechanism. It is worth noting that the Tafel slope for the embodiment Fe—Co hybrid catalyst (87 mV/dec) is nearly the same as that of the PANI-Fe—C, suggesting that the Fe-based active sites are important to the overall catalyst activity. In the case of the Pt catalyst (E-TEK), a Tafel slope of 60 mV/dec was obtained at a high potential range (>0.8 V), while at low potential range, a value of 120 mV $dec^{-1}$ was observed, indicating that the ORR mechanism on a Pt/PtO surface (at high potential) is different from that of a metallic Pt surface (at low potential) [14]. In theory, a Tafel slope of 120 mV $dec^{-1}$ is due to the rate-determining step associated with the first electron transfer, while a Tafel slope of 60 mV $dec^{-1}$ has been explained by the migration rate of adsorbed oxygen intermediates with a Temkin isotherm [15]. Hence, the Tafel slope of approximately 59 mV $dec^{-1}$ that was observed with the catalyst support suggests that the ORR rate is primarily determined by the migration of adsorbed oxygen intermediates. For the embodiment hybrid catalyst and the PANI-Fe catalyst, Tafel slopes between 80 and 90 mV $dec^{-1}$ are indicative of a more complicated ORR mechanism. The rate-determining step most likely simultaneously involves both intermediate migration as well as charge transfer [16].

The influence of temperature on the oxygen reduction reaction was determined for PANI-Fe—C and the embodiment hybrid Fe—Co catalyst in 0.5 M $H_2SO_4$ electrolyte to measure the relative activation energies for oxygen reduction. According to Eq. (1) [17], the standard apparent electrochemical energy of activation, $E_a$, can be estimated by measuring the slope of the Arrhenius plot, i.e. log j vs. 1/T.

$$(E_a)_E = -2.303R\left(\frac{\partial \log j}{\partial (1/T)}\right)_E \quad (1)$$

Figure 2D:
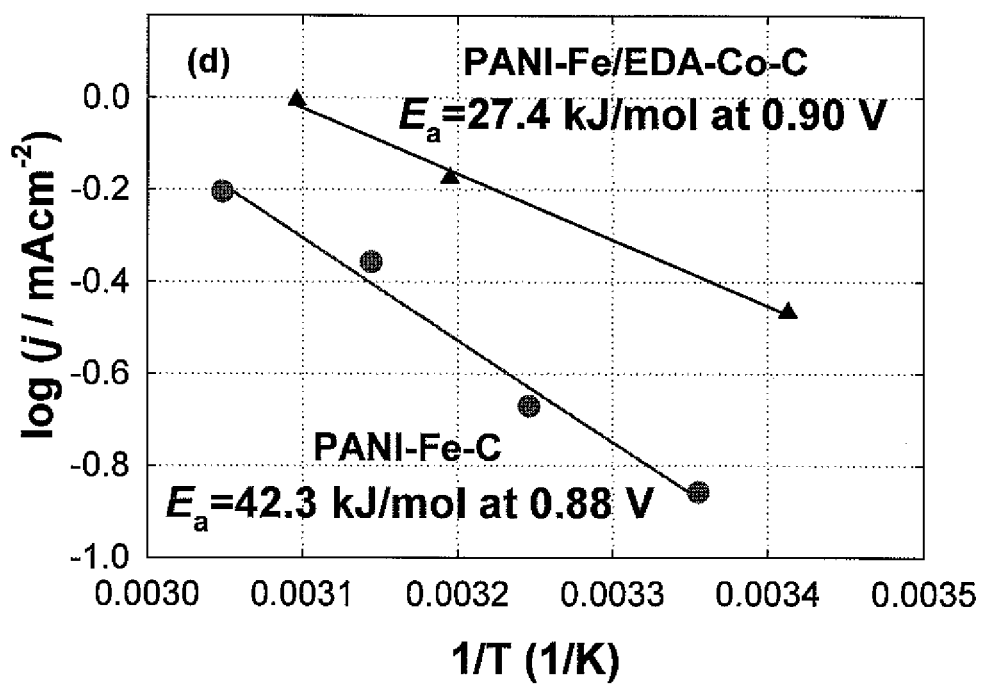

FIG. 2d provides the Arrhenius plot constructed at constant potential chosen in the kinetic region 0.88 and 0.90 V for these two catalysts, respectively. The $E_a$ for the oxygen reduction reaction of the embodiment Fe—Co hybrid catalyst (of 27.4 kJ/mol) is much lower than that for PANI-Fe—C (42.3 kJ/mol).

Fuel cell polarization data recorded on the EDA-Co—C catalyst support, the PANI-Fe—C, and the embodiment Fe—Co hybrid catalyst are compared in the plot shown in FIG. 3a. In good agreement with the RDE results, the open-cell voltage (OCV) value measured with the EDA-Co—C catalyst support was approximately 0.78 V, which is significantly lower than the PANI-Fe—C (0.95 V). The OCV of the PANI-Fe—C is comparable to that of the embodiment Fe—Co hybrid catalyst. From these data, it is apparent that the hybrid catalyst performed noticeably better when the voltage was lower than 0.90 V. This provides further support for the promotional role of the catalyst support in oxygen reduction reaction activity. Under these experimental conditions, the embodiment Fe—Co hybrid catalyst generates a current density of 0.11 A/cm$^2$ at 0.8 V. Using standard testing protocols ($H_2$—$O_2$/1.0-1.0 bar), in the optimized cathode layer (see FIG. 4), the catalyst volumetric activity at 0.8 V is 98 A/cm$^3$. Table 1 below shows some performance metrics for the embodiment hybrid Fe—Co catalyst.

TABLE 1

| Catalyst loading (mg/cm$^2$) | I at 0.8 V (A/cm$^2$) at 1.0 bar $O_2$ | Volumetric activity at 0.8 V (A/cm$^3$) |
|---|---|---|
| 4.0 | 0.06 | Approximately 30 |
| 1.0 | 0.05 | Approximately 98 |

Previous results on PANI-Fe—C catalysts indicate that the overall operating voltage can significantly affect their performance. For example, it was reported that no degradation was observed at 0.4 V, but greater than 50% performance was lost after 200 hours of operation at 0.6 V [4]. It is believed that the operating voltages affect the oxidation state of the active species and change the hydrophilicity of the catalyst layer, resulting in dramatic performance variations.

To study such degradation effects, the hybrid Fe—Co catalyst was periodically cycled between 0.4 and 0.6 V during the fuel cell life test. The results are shown in FIG. 5a and FIG. 5b.

FIG. 5 shows plots illustrating cycled systems during rotating disk electrode (RDE) testing. The RDE included a loading of 0.60 mg/cm$^2$, and a medium of 0.5M sulfuric acid ($H_2SO_4$). The disk rotated at a rate of 90° rotations per minute (rpm). The reference electrode was a Ag/AgCl electrode in 3 molar sodium chloride (3M NaCl). The counterelectrode was a graphite rod. A steady state potential program was employed. The OCP was 300 seconds; 30 millivolt steps; 30 seconds per step. Cycling was at 25° C. and 60° C., and the scan rate was 50 millivolts per seconds, from zero to 1.0 volts. Both plots are for the Fe—Co hybrid catalyst. The medium is $O_2$-saturated 0.5M $H_2SO_4$.

FIG. 5a shows data plotted for 20 cycles and for 2500 cycles. The top curve plots data for 2500 cycles, and the bottom curve plots data for 20 cycles.

FIG. 5b shows cycling in $O_2$-saturated 0.5M $H_2SO_4$ electrolyte after the 20$^{th}$ cycle and after the 2500$^{th}$ cycle. As these plots show, there was loss of performance in the $O_2$-saturated electrolyte for the hybrid catalyst.

Performance was observed to decrease at 0.6 V, and it remained stable at 0.4 V. Partial performance recovery was observed when the catalyst was shifted from 0.4 to 0.6 V for short time. However, however, long-term operation at 0.6 V results in irreversible degradation, which suggests that the active catalytic sites are permanently blocked by local water flooding or damaged in the high potential electrochemical environment.

FIGS. 6a and 6b show results plotted for the effect of humidity on durability. The fuel cell life of the hybrid Fe—Co catalyst was examined at different humidification conditions (a) and low catalyst loading (b). The anode loading was 0.25 milligrams of Pt per square centimeter. The membrane was NAFION 212. The cell operating temperature was 80° C. Fuel cell performance at 0.60 V in a lowered humidity environment was seen to be essentially reversible. The flooding mechanism, rather than active site degradation is likely responsible for much of the catalyst performance loss. However, low catalyst loading (i.e. a thinner layer) is still unable to improve the durability. Perhaps the flooding occurred near active sites in micropores.

X-ray photoelectron spectroscopy (XPS) was used to analyze each non-precious metal catalyst at different stages of synthesis. Quantitative elemental analysis indicates a nitrogen content increase from 1.93 atomic present (at %) for the EDA-Co—C catalyst support to 5.49 at % for PANI-Fe catalysts, while the hybrid Fe—Co catalyst lead to an even higher nitrogen content of 6.00 at %. The transition metals in the hybrid catalyst that were subjected to a thorough acid leach were found to be around 0.81 at % for Fe and undetectable for Co. In non-precious metal ORR catalysts of this type, the metal free doped nitrogen atoms into the carbon structures are important to the overall catalytic mechanism. The N is spectra for these non-precious metal catalysts are shown in FIG. 7. The two dominant nitrogen peaks are correlated to quaternary (401.1 eV) and pyridinic (398.5 eV) nitrogen, and reflect the relative types of nitrogen-atom doping at the interior and edge of graphitized carbon planes, respectively [18]. When compared to the catalyst support, the PANI-Fe sample has a relatively higher peak intensity for quaternary nitrogen, indicating that nitrogen atoms favor doping at the interior rather than at the edges of the graphene layer in the presence of Fe. During the pyrolysis, pyridinic and quaternary nitrogen are in equilibrium, which is shifted towards quaternary nitrogens with the addition of Fe metals [19, 20]. It is generally accepted that pyridinic nitrogens facilitate oxygen reduction [6]. However, these data indicate that the less pyridinic N-containing Fe-based catalysts are more active than the pyridinic N-rich Co-based materials. The active sites related to the Fe species are likely responsible for this enhanced activity in the hybrid catalyst.

The morphology of the embodiment hybrid Fe—Co catalyst was studied using electron microscopy images (SEM and HR-TEM) at different stages in its synthesis. The morphology of the catalyst support was dominated by carbon nanostructures resembling nanotubes, nanofibers, and onion-like carbon, which result from the carbonization of the ethylenediamine. A possible growth mechanism for the metal-encapsulated onion-like carbon in this material can be approximated based on a vapor-liquid-solid model [18]. Briefly, during thermal treatment in an inert atmosphere at 900° C., the EDA-Co complex decomposes into a mixture of gaseous carbon and nitrogen along with Co metal particles. These gaseous carbon and nitrogen species are gradually captured by the metal nanoparticles, which act to catalyze the formation of small nitrogen-doped carbon fragments. Structural defects in these fragments, especially the dangling bonds at their, possibly act as nucleation points for further assembly and rearrangement to form the final layered structure on the surface of metal particles. Of note, these small graphitic onion layers are not perfectly concentric to each other, and usually form graphitic layers that have dislocations and irregular relative curvatures. The PANI-Fe catalyst exhibits significant different morphologies. No dominant graphitized carbon nanostructures were observed. This significant difference highlights the major role of the different transition metals and nitrogen precursors in influencing the overall catalyst nanostructure. It is worth noting that graphene sheet structures, not observed in the catalyst support and PANI-Fe systems, were abundant in the Fe—Co hybrid catalyst. The significant changes in the various nanostructures are perhaps are due to the simultaneous presence of Co and PANI because similar graphene structures are also abundant in the support catalysts. The catalytic role of Co metal may be to effectively catalyze PANI decomposition at the atomic level, allowing for the rearrangement of the carbon and nitrogen atom, to form highly graphitic, potentially N-doped, graphene sheets [21]. In these materials, the properties of the graphene sheets (e.g. high surface area, good conductivity, a graphitized basal-plane structure) may contribute to the increased catalytic performance of the hybrid Fe—Co catalyst relative to the EDA-Co—C and PANI-Fe—C. There appears to be a correlation between the appearance of graphene sheets and higher catalyst durability [4].

The performance of the embodiment Fe—Co hybrid catalyst of this invention was compared to other Fe—Co hybrid catalysts. FIG. 8 shows a graph of current density versus potential for three hybrid catalysts. The graph labeled 1 refers to the Fe—Co hybrid catalyst reported in Wu et al., "Nitrogen-doped magnetic onion-like carbon as support for Pt particles in a hybrid cathode catalyst for fuel cells," J. Mater. Chem., February 2010, vol. 20, pp. 3059-3068. The graph labeled 2 refers to the Fe—Co hybrid catalyst reported in Subramanian et al., "Nitrogen-modified carbon-based catalysts for oxygen reduction reaction in polymer electrolyte membrane fuel cells," J. Power Sources, November 2008, vol. 188, pp. 38-44. The graph labeled 3 refers to the Fe—Co hybrid catalyst reported in Wu et al., "Polyaniline-derived Non-Precious Catalyst for the Polymer Electrolyte Fuel Cell Cathode," ECS Trans., October 2008, vol. 16, pp. 159-170. The graph labeled 4 refers to the embodiment Fe—Co hybrid catalyst prepared according to the two part synthesis shown in FIG. 1a and FIG. 1b. According to FIG. 8, catalyst 4, i.e. the embodiment Fe—Co hybrid catalyst shows a significant improvement in activity based on the positive shifts in onset potential and half-wave potential relative to catalyst 1, catalyst 2 and catalyst 3. Some parameters for the rotating disk electrode generated data are: loading was 0.60 mg/cm2; 0.5 M $H_2SO_4$ electrolyte; 900 rpm; temperature was 25° C., Ag/AgCl (3 M NaCl) reference electrode); graphite rod counterelectrode; steady-state potential program; OCP, 300 s, 30 mV steps, 30 seconds per step.

Electrochemical cells that include cathodes with Fe—Co hybrid catalysts of this invention are useful as fuel cells. Embodiments of these electrochemical fuel cells of the present invention, like other fuel cells, convert fuel and oxidant to electricity and reaction product. These cells include ionomeric membranes such as a poly (perfluorosulphonic acid) membrane which is commercially available as Nafion® 117, Aciplex®, or Flemion®. Other ionomeric membrane materials known in the art, such as sulfonated styrene-ethylene-butylene-styrene; polystyrene-graft-poly(styrene sulfonic acid); poly(vinylidene fluoride)-graft-poly(styrene sulfonic acid); poly(arylene ether), such as poly(arylene ether ether ketone) and poly(arylene ether sulfone); polybenzimidazole; polyphosphazene, such as poly [(3-methylphenooxy) (phenoxy) phosphazene] and poly [bis(3-methylphenoxy) phosphazene]; derivatives thereof; and combinations thereof may also be used.

In summary, a hybrid Fe—Co catalyst for oxygen reaction reduction was prepared. This hybrid catalyst was stable even after 5,000 potential cycles in aqueous electrolyte, and durable to constant voltage testing at 0.40 V in a real-world fuel cell system. These performance enhancements are thought to be due to the greatly reduced activation energy and the catalyzed formation of graphene-sheet-like structures in the catalyst. Catalyst morphology at different synthesis stages was characterized using scanning electron microscopy (SEM). Graphene sheet structures were abundant in the hybrid catalyst. Loading differences notwithstanding, the performance gap in terms of $E_{1/2}$ in RDE testing between the hybrid Fe—Co catalyst (600 μg/cm$^2$) and Pt/C (60 μg$_{Pt}$/cm$^2$) catalysts is approximately 35 mV in acidic media. The hybrid Fe—Co catalyst performed better than other known hybrid Fe—Co catalysts.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

REFERENCES

The references below are incorporated by reference herein.

[1] Lefevre et al., "Iron-Based Catalysts with Improved Oxygen Reduction Activity in Polymer Electrolyte Fuel Cells," Science, April 2009, vol. 324, pp. 71-74.

[2] Wu et al., "Pt-free cathode catalysts prepared via multi-step pyrolysis of Fe phthalocyanine and phenolic resin for fuel cells," Chem. Commun., August 2010, vol. 46, pp. 6377-6379.

[3] Wu et al., "Polyaniline-derived Non-Precious Catalyst for the Polymer Electrolyte Fuel Cell Cathode," ECS Trans., October 2008, vol. 16, pp. 159-170.

[4] Wu et al., "Performance Durability of Polyaniline-derived Non-Precious Cathode Catalysts," ECS Trans., October 2009, vol. 25, pp. 1299-1311.

[5] Yang et al., "Aligned carbon nanotubes with built-in FeN4 active sites for electrocatalytic reduction of oxygen," Chem. Commun., available online November 2007, pp. 329-331.

[6] Nallathambi et al., "Development of high performance carbon composite catalyst for oxygen reduction reaction in PEM Proton Exchange Membrane fuel cells," J. Power Sources May 2008, vol. 183, pp. 34-42.

[7] Bezerra et al., "A review of Fe—N/C and Co—N/C catalysts for the oxygen reduction reaction," Electrochim. Acta, February 2008, vol. 53, pp. 4937-4951.

[8] Jaouen et al., "Cross-Laboratory Experimental Study of Non-Noble-Metal Electrocatalysts for the Oxygen Reduction Reaction," ACS Appl. Mater. Interfaces, August 2009, vol. 1, pp. 1623-1639.

[9] Koslowski et al., "Nature of the Catalytic Centers of Porphyrin-Based Electrocatalysts for the ORR: A Correlation of Kinetic Current Density with the Site Density of Fe—N$_4$ Centers," J. Phys. Chem. C, September 2008, vol. 112, pp. 15356-15366.

[10] Matter et al., "The role of nanostructure in nitrogen-containing carbon catalysts for the oxygen reduction reaction," J. Catalysis, February 2006, vol. 239, pp. 83-96.

[11] Maldonado et al., "Structure, composition, and chemical reactivity of carbon nanotubes by selective nitrogen doping," Carbon, January 2006, vol. 44, pp. 1429-1437.

[12] Subramanian et al., "Nitrogen-modified carbon-based catalysts for oxygen reduction reaction in polymer electrolyte membrane fuel cells," J. Power Sources, November 2008, vol. 188, pp. 38-44.

[13] Ikeda et al., "Carbon Alloy Catalysts: Active Sites for Oxygen Reduction Reaction," J. Phys. Chem. C, September 2008, vol. 112, pp. 14706-14709.

[14] Wakabayashi et al., "Temperature dependence of oxygen reduction activity at a platinum electrode in an acidic electrolyte solution investigated with a channel flow double electrode," J Electroanalyt. Chem., available online October 2004, vol. 574, pp. 339-346.

[15] Coutanceau et al., "Electrocatalytic reduction of dioxygen at platinum particles dispersed in a polyaniline film," Electrochim. Acta, December 2000, vol. 46, pp. 579-588.

[16] Wu et al., "Carbon-supported $Co_{1.67}Te_2$ nanoparticles as electrocatalysts for oxygen reduction reaction in alkaline electrolyte," J. Mater. Chem., July 2009, vol. 19, pp. 6581-6589.

[17] Wu et al., "Anodically electrodeposited Co+Ni mixed oxide electrode: preparation and electrocatalytic activity for oxygen evolution in alkaline media," J. Solid State Chem., August 2004, vol. 177, pp. 3682-3692.

[18] Wu et al., "Nitrogen-doped magnetic onion-like carbon as support for Pt particles in a hybrid cathode catalyst for fuel cells," J. Mater. Chem., February 2010, vol. 20, pp. 3059-3068.

[19] Wu et al., "Enhanced methanol electrode oxidation activity of PtRu catalysts supported on heteroatom-doped carbon," Electrochim. Acta, April 2008, vol. 53, pp. 7622-7629.

[20] Wu et al., "Well-Dispersed High-Loading Pt Nanoparticles Supported by Shell-Core Nanostructured Carbon for Methanol Electrooxidation," Langmuir, February 2008, vol. 24, pp. 3566-3575.

[21] Qu et al., "Nitrogen-Doped Graphene as Efficient Metal-Free Electrocatalyst for Oxygen Reduction in Fuel Cells," ACS Nano, February 2010, vol. 4, pp. 1321-1326.

What is claimed is:

1. A method for preparing a Fe—Co hybrid catalyst, comprising:
   reacting an ethyleneamine with a cobalt-containing precursor to form a cobalt-containing complex,
   combining the cobalt-containing complex with an electroconductive carbon supporting material,
   heating the cobalt-containing complex and electroconductive carbon supporting material under conditions suitable to convert the cobalt-containing complex and electroconductive carbon supporting material into a cobalt-containing catalyst support,
   polymerizing an aniline in the presence of said cobalt-containing catalyst support and an iron-containing compound under conditions suitable to form a supported, cobalt-containing, iron-bound polyaniline species,
   subjecting said supported, cobalt-containing, iron bound polyaniline species to conditions suitable for producing a Fe—Co hybrid catalyst.

2. A method of catalyst synthesis comprising:
   a) providing an ethyleneamine-cobalt-carbon support by:
      i) combining a cobalt-containing precursor, an ethyleneamine, and carbon black and a first suitable solvent to produce a suspension;
      ii) evaporating the solvent from the suspension to form an intermediate mixture;
      iii) heating the intermediate mixture in an inert atmosphere; and
      iv) acidifying to form a first mixture;
   b) providing a polyaniline-iron complex by combining an iron-containing precursor with a polyaniline compound in a second suitable solvent to produce a second mixture;
   c) combining the first mixture with the second mixture to produce a third mixture;
   d) heating the third mixture in an inert atmosphere to a first temperature;
   e) subsequently acidifying the third mixture; and
   f) subsequently re-heating the third mixture to a second temperature to anchor the polyaniline-iron complex to the ethyleneamine-cobalt-carbon support.

3. The method of claim 2, wherein the ethyleneamine comprises ethylenediamine, diethylenetriamine, or combinations thereof.

4. The method of claim 2, wherein the cobalt-containing precursor is $Co(NO_3)_2.6H_2O$.

5. The method of claim 2, wherein the heating step of step a) iii) is to a temperature of at least 900° C.

6. The method of claim 2, wherein the acidifying step of a) iv) is performed at a temperature of at least 80° C.

7. The method of claim 2, further including a step of polymerizing an aniline using $(NH_4)_2S_2O_8$ as oxidizing agent.

8. The method of claim 2, wherein the iron-containing precursor is $FeCl_3$.

9. The method of claim 2, wherein the first temperature is at least 900° C.

10. The method of claim 2, wherein the second temperature is at least 900° C.

11. The method of claim 2, wherein the second mixture is acidified at a temperature of at least 80° C.

* * * * *